(12) United States Patent
Staver (10) Patent No.: US 9,976,901 B2
(45) Date of Patent: May 22, 2018

(54) ULTRA-NARROW BAND-PASS VIA ETALON EXTERNAL TO A LONG-WAVELENGTH INFRARED SENSOR

(71) Applicant: BAE SYSTEMS Information and Electronic Systems Integration Inc., Nashua, NH (US)

(72) Inventor: Philip R Staver, Wilton, NH (US)

(73) Assignee: BAE Systems Information and Electronic Systems Integration Inc., Neshua, NH (US)

( * ) Notice: Subject to any disclaimer, the term of this patent is extended or adjusted under 35 U.S.C. 154(b) by 186 days.

(21) Appl. No.: 14/825,460

(22) Filed: Aug. 13, 2015

(65) Prior Publication Data

US 2017/0038256 A1    Feb. 9, 2017

Related U.S. Application Data

(60) Provisional application No. 62/037,179, filed on Aug. 14, 2014.

(51) Int. Cl.

| | |
|---|---|
| G01J 3/26 | (2006.01) |
| G02B 1/11 | (2015.01) |
| G02B 5/28 | (2006.01) |
| G02B 13/00 | (2006.01) |
| G01J 3/02 | (2006.01) |
| G02B 5/26 | (2006.01) |
| G01J 3/12 | (2006.01) |

(52) U.S. Cl.
CPC ............... *G01J 3/26* (2013.01); *G01J 3/0208* (2013.01); *G02B 1/11* (2013.01); *G02B 5/284* (2013.01); *G02B 13/0095* (2013.01); *G01J 2003/1213* (2013.01); *G02B 5/26* (2013.01)

(58) Field of Classification Search
CPC .... G01J 3/26; G01J 3/0208; G01J 2003/1213; G02B 1/11; G02B 5/284; G02B 13/0095; G02B 5/26

See application file for complete search history.

(56) References Cited

U.S. PATENT DOCUMENTS

| | | | | |
|---|---|---|---|---|
| 3,373,651 | A * | 3/1968 | Mack ..................... | G01J 3/26 356/454 |
| 4,076,422 | A * | 2/1978 | Kohno .................... | G01J 3/26 356/454 |
| 4,525,067 | A * | 6/1985 | Hernandez ............... | G01J 3/26 356/454 |
| 4,998,017 | A * | 3/1991 | Ryan ...................... | G01J 3/26 250/343 |
| 4,999,013 | A * | 3/1991 | Zoechbauer ............. | G01J 3/26 356/454 |
| 6,091,546 | A * | 7/2000 | Spitzer .................. | G02B 27/017 345/8 |

(Continued)

OTHER PUBLICATIONS

J. Raab, Integrated Detector Cooler Assembly for Space Applications, Jul. 2012, Crycocoolers 17, pp. 525-529.*

(Continued)

*Primary Examiner* — Michael P Lapage
(74) *Attorney, Agent, or Firm* — Maine Cernota & Rardin (57) ABSTRACT

An optical system with ultra-narrow optical band-pass comprising an objective lens group, and a relay group, having a collimating system, the relay group being in optical communication with the objective lens group.

15 Claims, 7 Drawing Sheets

(56) References Cited

U.S. PATENT DOCUMENTS

| | | | | |
|---|---|---|---|---|
| 6,101,201 | A * | 8/2000 | Hargis | H01S 3/0627 372/107 |
| 6,496,268 | B1 * | 12/2002 | McKie | G01B 17/02 356/503 |
| 7,502,117 | B1 * | 3/2009 | Wickholm | G01B 9/02059 356/450 |
| 2003/0016708 | A1 * | 1/2003 | Albrecht | H01S 3/1055 372/25 |
| 2003/0103550 | A1 * | 6/2003 | Davis | G01N 25/16 374/55 |
| 2013/0215925 | A1 * | 8/2013 | Kaster | H01S 3/0057 372/98 |
| 2013/0221206 | A1 * | 8/2013 | Crowther | G01J 1/00 250/216 |

OTHER PUBLICATIONS

Aron Trayloer, What is an Integrated Detector Aseembly, Nov. 29, 2010, College of Optical Sciences, University of Arizona, pp. 1-17.*

* cited by examiner

ULTRA-NARROW BAND-PASS VIA ETALON EXTERNAL TO A LONG-WAVELENGTH INFRARED SENSOR

RELATED APPLICATIONS

This application claims the benefit of U.S. Provisional Application No. 62/037,179, filed Aug. 14, 2014, which is herein incorporated in its entirety, by reference, for all purposes.

STATEMENT OF GOVERNMENT INTEREST

The present invention was made with United States Government assistance under Contract No. 09-C-8656, awarded by a classified customer. The United States Government has certain rights in the present invention.

FIELD OF THE INVENTION

The invention relates to optical imaging sensors, and more specifically, to optical imaging sensors having high spectral resolution.

BACKGROUND OF THE INVENTION

Optical filters are devices that selectively transmit light of certain wavelengths while attenuating light outside of these wavelengths. Such filters most typically comprise plane glass or plastic devices, inserted in an optical path, which are either dyed in the bulk or utilize interference coatings. Such devices can be completely described by their frequency response, which specifies how the magnitude and phase of each frequency component of an incoming signal is modified by the filter.

Filters that pass long wavelengths only are generally referred to as longpass filters, filters that pass short wavelengths only are generally referred to as shortpass filters, and filters that pass a band of wavelengths, attenuating both longer and shorter wavelengths, are generally referred to as bandpass filters. In bandpass filters, the "passband", or wavelengths which are allowed pass through the filter, may be narrow or wide and the transition or cutoff between maximal and minimal transmission can be sharp or gradual.

Optical filters can be classified, generally, into two primary categories: absorptive filters and interference, or dichroic, filters. Dichroic filters may also be referred to as "reflective" or "thin film" filters. Absorptive filters selectively absorb certain wavelengths passing therethrough and reradiate the electromagnetic energy absorbed in a different form, such as thermal energy. Absorptive filters are typically the less expensive of the two, but are not generally suitable for precise scientific work.

Dichroic filters use the principle of interference and most typically function by reflecting the unwanted portion of the light and transmitting the remainder using thin, transparent optical substrates coated with a series of thin dielectric layers deposited on the surfaces thereof, using various techniques known to those skilled in the art. Opposite the dielectric layers, there is typically an anti-reflection coating, or other coatings to provide specified transmission characteristics. These layers form a sequential series of reflective cavities that resonate with the desired wavelengths; other wavelengths destructively cancel or reflect as the peaks and troughs of the waves overlap.

Since the exact wavelength range of a dichroic filter can be precisely controlled by altering the thickness and sequence of the coatings, they are particularly suited for precise scientific work. They are usually, however, much more expensive and delicate than available alternatives, such as the previously-mentioned absorption filters. Filters of this type are also commonly used in devices such as the dichroic prism of a camera to separate a beam of light into different colored components.

Another optical device well suited for precision scientific work is a Fabry-Pérot interferometer. Such an interferometer uses two mirrors to establish a resonating cavity: only those wavelengths that are a multiple of the cavity's resonance frequency are passed.

Etalons are another variation: transparent cubes or fibers whose polished ends form mirrors tuned to resonate with specific wavelengths. These are often used to separate channels in telecommunications networks that use wavelength division multiplexing, as is used on long-haul optical fiber networks.

Because of limitations inherent in this technology, the narrowest band-pass filters that can be achieved using current state of the art filters have spectral band-pass values in the range of 50 to 100 nm, for Long-Wavelength InfraRed (LWIR) operational wavelengths (8-12 microns). For some applications, however, it is beneficial and desirable to have an optical band-pass that is significantly narrower (smaller). Filters capable of filtering as low as 5 to 15 nm of optical bandwidth would be particularly desirable. Although such band-pass values can be achieved in filters operating in the visible wavelengths, these values are unachievable in the LWIR using current state of the art filters.

Figure 1:
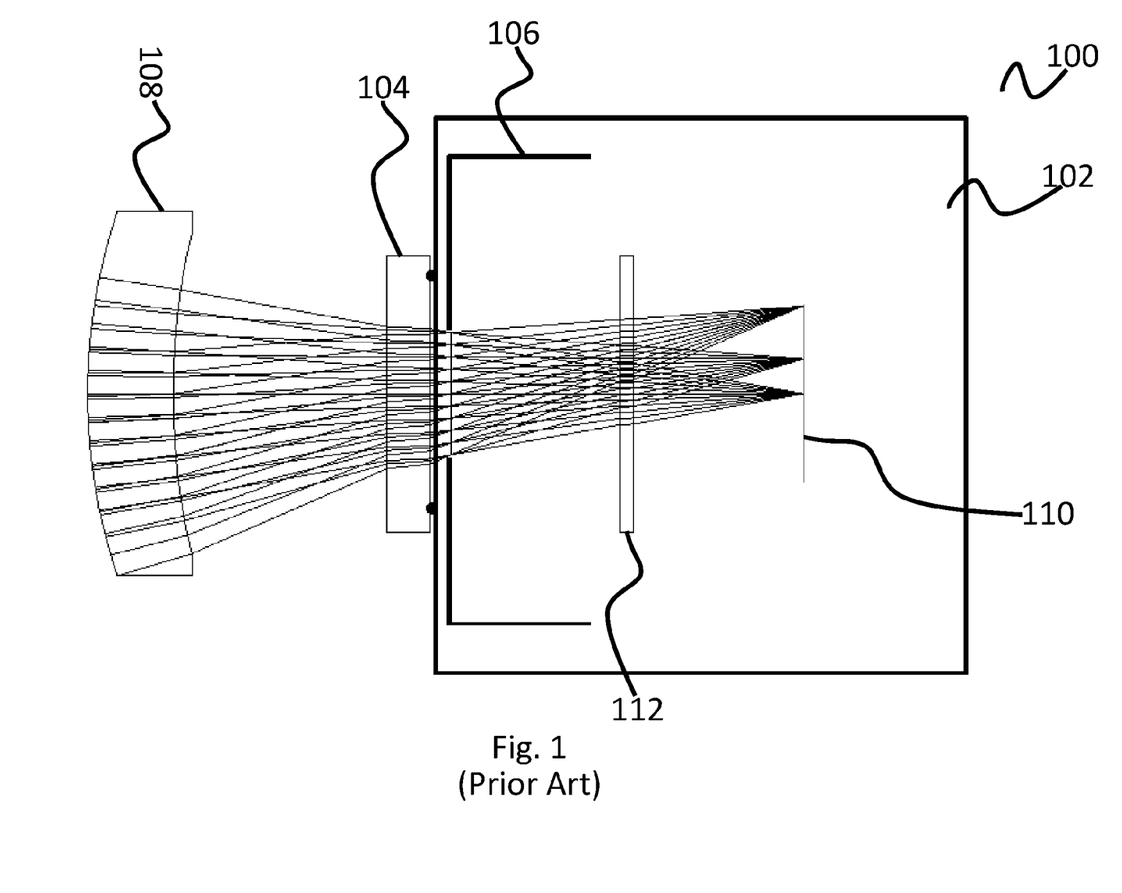
FIG. 1 is a depiction of a prior art embodiment, namely the Dewar configuration of a conventional LWIR sensor in the region surrounding the focal plane.

FIG. 1 depicts the Dewar configuration of a conventional LWIR sensor in the region surrounding the focal plane, the plane through the focus perpendicular to the axis of a mirror or lens. The device preceding the focal plane is the optical band-pass filter, which determines the spectral width of the optical band-pass filter preceding the focal plane array. Typically, because of the limitations of dielectric filter technology, the spectral width preceding the focal plane array is limited to 100 nm, but, for some applications, it may beneficial if this value was considerably less.

What is needed, therefore, are techniques for decreasing the lower limit of band-pass filters operating in LWIR and similar wavelengths while narrowing the filtration range.

BRIEF SUMMARY OF THE INVENTION

One embodiment of the present invention provides an optical system with ultra-narrow optical band-pass comprising: an objective lens group; and a relay lens group comprising a collimating system, the relay group being in optical communication with the objective lens group.

Another embodiment of the present invention provides such an optical system wherein the objective lens group comprises a primary convex lens situated to refract light to an objective lens situated to refract light to a secondary convex lens situated to refract light to a biconcave lens.

A further embodiment of the present invention provides such an optical system wherein the relay lens group comprises an interferometer.

Yet another embodiment of the present invention provides such an optical system wherein the interferometer comprises two parallel highly reflecting mirrors.

A yet further embodiment of the present invention provides such an optical system wherein the relay lens group comprises an etalon.

Still another embodiment of the present invention provides such an optical system wherein the etalon comprises a transparent plate with two reflecting surfaces.

A still further embodiment of the present invention provides such an optical system wherein the etalon is a Fabry-Perot etalon.

Even another embodiment of the present invention provides such an optical system wherein the Fabry-Perot etalon comprises a plano etalon pair.

An even further embodiment of the present invention provides such an optical system wherein the plano etalon pair is air spaced.

A still even another embodiment of the present invention provides such an optical system wherein each etalon in the etalon pair is wedge shaped.

A still even further embodiment of the present invention provides such an optical system wherein the Fabry-Perot etalon comprises a curved etalon pair.

Still yet another embodiment of the present invention provides such an optical system wherein surfaces of the curved etalon pair are slightly convex.

A still yet further embodiment of the present invention provides such an optical system wherein surfaces of the curved etalon pair are of slightly different curvature.

Even yet another embodiment of the present invention provides such an optical system wherein the curved etalon pair is air-spaced.

An even yet further embodiment of the present invention provides such an optical system wherein the etalon spacing is approximately 0.34895 mm.

Still even yet another embodiment of the present invention provides such an optical system wherein all surfaces of the curved etalon pair are of substantially the same curvature.

A still even yet further embodiment of the present invention provides such an optical system of claim 11 wherein the radius of curvature of each etalon in the curved etalon pair is 300 mm.

Yet still even another embodiment of the present invention provides such an optical system wherein the Fabry-Perot etalon a rear surface thereof further comprises an anti-reflective coating.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

DETAILED DESCRIPTION OF THE INVENTION

It is the subject of this disclosure that a Fabry Perot etalon 206 may be advantageously inserted in an optical system in a manner to provide a composite filter architecture, in which a dichroic band-pass filter acts in conjunction with the etalon 206 to provide a significant improvement in optical band-pass performance over the current state of the art.

One measure of the performance of an optical sensor is the noise-equivalent power, NEP, which measures the sensitivity of a photodetector or detector system. It is defined as the signal power that gives a signal-to-noise ratio of one in a one hertz output bandwidth, where an output bandwidth of one hertz is equivalent to half a second of integration time. A smaller NEP corresponds to a more sensitive detector.

For an optical sensor such as that described, the NEP can be computed according to equation 1, shown below, where $\Delta\lambda$ represents the spectral width of the optical band-pass filter preceding the focal plane array 110. The other parameters in equation 1 represent other properties of the optics and detector system; such as the detector array, the readout electronics, the temperature of the optical scene (typically 300 K), and values of physical constants. These parameters (with the exception of $\Delta\lambda$), are of no concern of the topic of this invention, and will not be discussed further.

Equation 1:

$$NEP = \left(\frac{hc}{\lambda}\right)\left\{\left(\frac{\theta\pi A\Delta f}{\eta}\right)\left[\left(\frac{\Omega}{\pi}\right) - \left(\frac{\Omega}{\pi}\right)^2\right]\left(\frac{c\Delta\lambda}{\lambda^4}\right)\frac{1}{e^{hc/\lambda\pi T}-1}\right\}^{\frac{1}{2}}$$

Equation 1 illustrates that there is considerable benefit to reducing the spectral band width, Δλ, of the optical system, which is the subject of this invention.

FIG. 1 shows a prior art Dewar configuration of a conventional LWIR (Long Wavelength Infrared) sensor 100 in the region surrounding the focal plane. Specifically, the prior art Dewar configuration of a conventional LWIR sensor 100 comprises an evacuated volume 102, a Dewar window 104, a cold shield 106, a last lens element 108, a focal plane array 110, and a cold filter 112.

Figure 2:
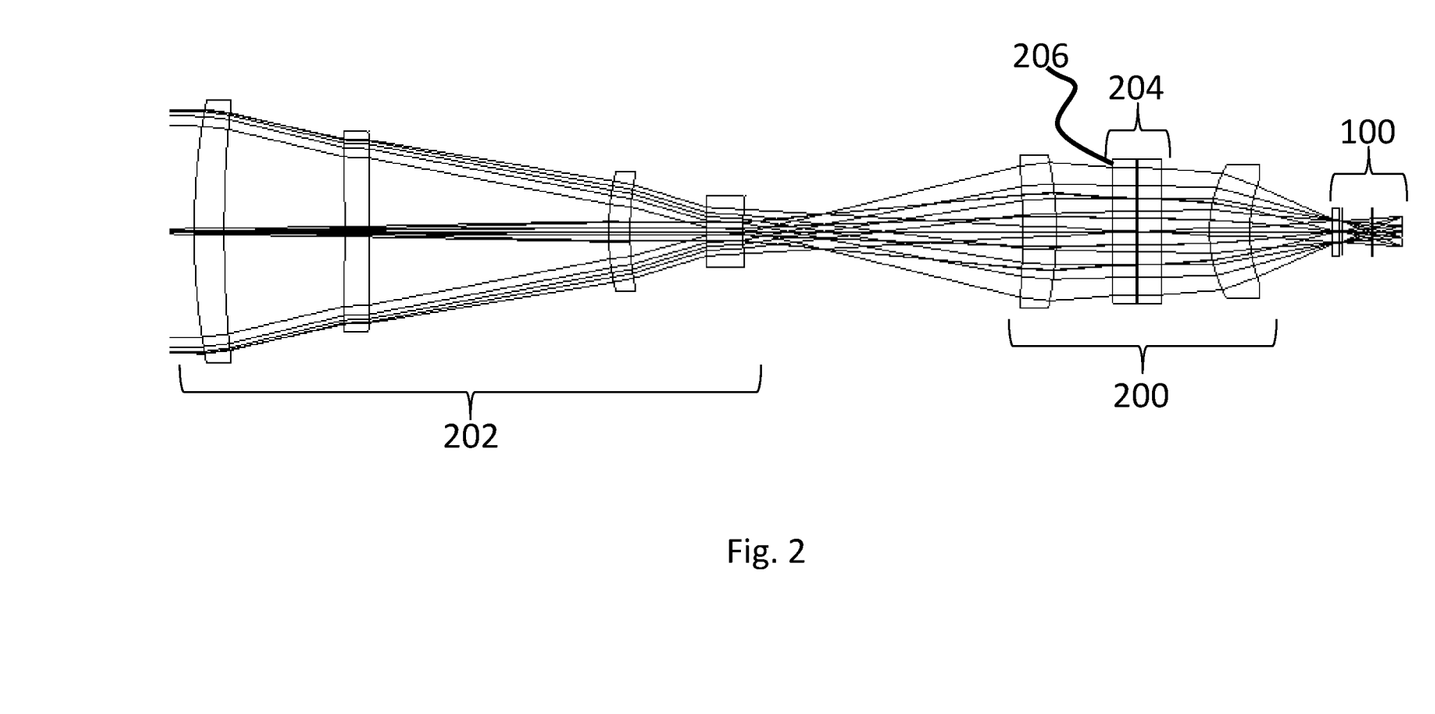
FIG. 2 is a depiction of an embodiment of the present invention showing the objective and relay lens groups.

FIG. 2 contains a depiction of an optical configuration in accordance with embodiments of the present disclosure. In order to achieve an optical band-pass of the desired value, an etalon 206 is placed in a region where the optical beam is nominally collimated 204. This collimated space 204 is required because the transmission of an etalon 206 is a strong function of the incidence angle of light on the etalon 206 surface; operating the etalon 206 in a region where the rays are nominally collimated 204 minimizes this effect. In order to achieve this configuration, the optical system containing the etalon 206 is comprised of two lens groups, an objective lens group 202 and a relay lens group 200. As shown in FIG. 2, the collimated region 204 resides within the relay lens group 200, thus this is where the etalon 206 is placed.

The transmission, T, of a Fabry-Perot etalon 206 is given by equations (2) through (4).

Equation 2:
$$T = \frac{1}{1 + F \sin^2(\delta/2)}, \text{ where:}$$

Equation 3:
$$\delta = \frac{2\pi}{\lambda} nd \cos\theta; \text{ and}$$

Equation 4:
$$F = \frac{4R}{(1-R)^2}$$

In these equations, the variables are defined as:
λ=wavelength;
n=index of refraction of etalon 206 spacing (1.0 for an air-spaced etalon);
d=thickness of etalon 206 spacing;
R=reflectance of etalon 206 surfaces; and
θ=Incidence angle of beam on etalon 206.

A parameter, commonly derived from the surface reflectance, R, of the etalon 206 is the known as the finesses, $\mathcal{F}$, where Equation 5:
$$\mathcal{F} = \frac{\pi\sqrt{R}}{1-R}$$

The full-width-at-half-maximum (FWHM), the absolute difference between the wavelengths at which the spectral radiant intensity is 50 percent of the maximum power, of the etalon 206 is then given by:

Equation 6:
$$FWHM = \frac{FSR}{\mathcal{F}}$$

In equation 6, above, FSR represents the Free-Spectral Range of the etalon 206, i.e. the spacing between successive maxima in the transmission spectrum. In wavelength units, the free-spectral range is given by equation (7), as shown below:

Equation 7:
$$FSR = \frac{\lambda^2}{2nd}$$

Figure 4A:
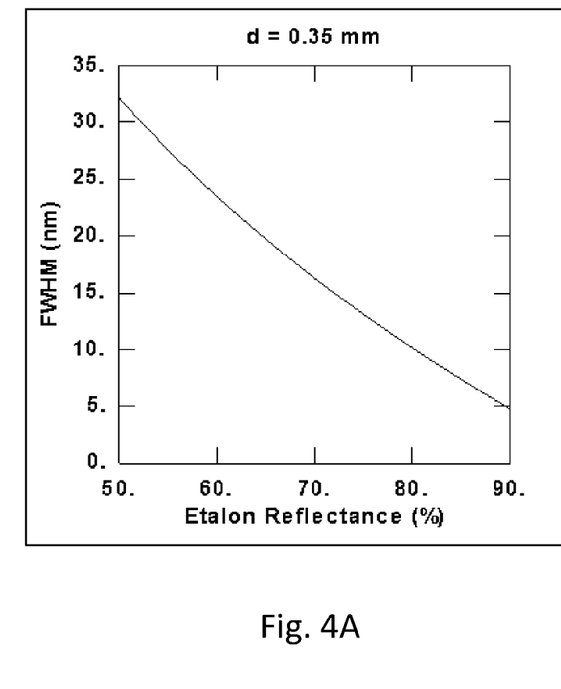
FIG. 4A is a graph of Full Width at Half Maximum (nm) v. Etalon Reflectance (%) for an embodiment of the present invention.
Figure 4B:
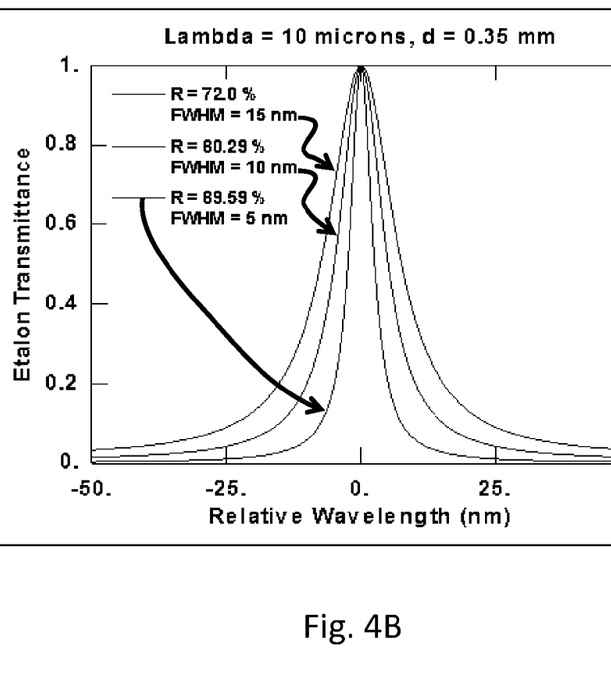
FIG. 4B is a graph of Etalon Transmittance v. Relative Wavelength (nm) for an embodiment of the present invention, performed at three percent reflectance levels.

Using equations (2) through (7), the spectral transmission characteristics of an etalon were computed; the result of this analysis is shown in FIGS. 4A & 4B. FIG. 4A shows the FWHM of the etalon 206, and FIG. 4B shows the transmission profile for three different surface coating values, R=72.0%, 80.3%, and 89.6%. These reflectance values yield FWHM values of 15 nm, 10 nm, and 5 nm, respectively. For each of these cases, an air-spaced etalon 206 was assumed, having an air-spacing of d=0.35 mm. Although other operational wavelengths may be desirable and can be utilized, these computations assumed an operational wavelength of λ=10.0 microns.

Figure 5A:
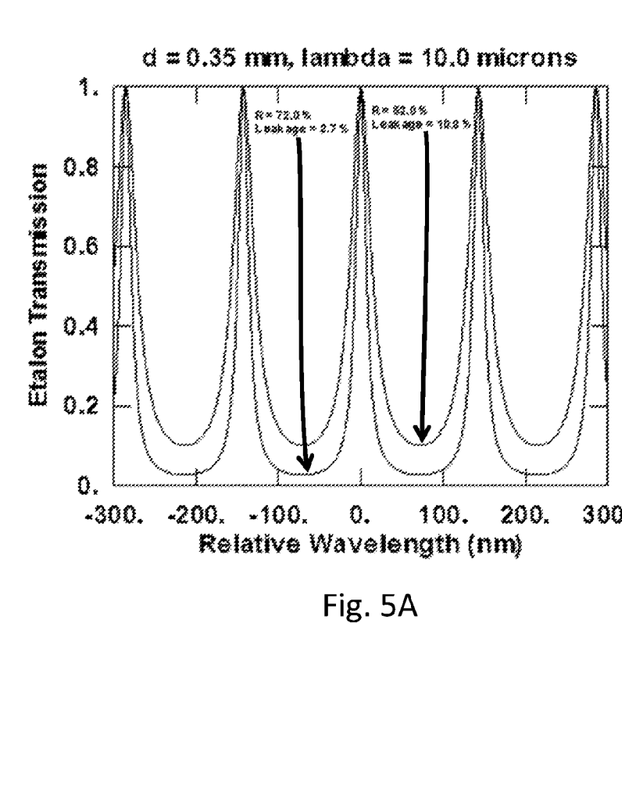
FIG. 5A is a graph of Etalon Transmission v. Relative Wavelength (nm) for an embodiment of the present invention.
Figure 5B:
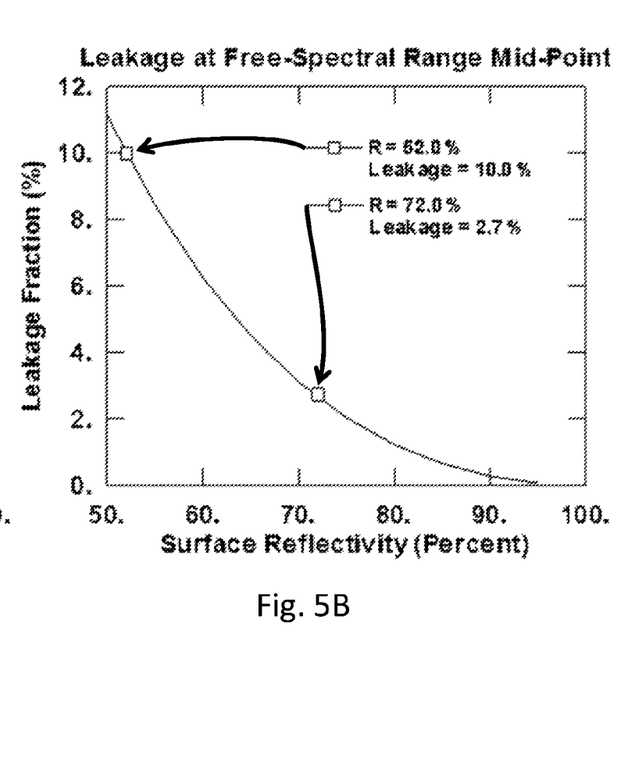
FIG. 5B is a graph of Leakage Fraction (%) v. Reflectance of Etalon Surfaces (%) for an embodiment of the present invention.

FIGS. 5A and 5B summarize the two chief problems with utilizing an etalon 206 as a narrow, dichroic, band-pass filter. The first problem is the existence of multiple transmission peaks, separated by the free-spectral range. The second problem is the existence of a small amount of leakage transmission mid-way between each successive maximum. The characteristics of the transmission spectrum predicted by equations (2) through (7) are shown in FIG. 5A, which shows that it is characterized by a series of multiple maxima, spaced by a wavelength interval corresponding to the value of the free-spectral range.

Now referring to FIG. 5B, it is shown that the transmission between each of the successive peaks is never entirely equal to zero and has some leakage, which can be several percent. In FIGS. 5A and 5B, two different etalon 206 designs are summarized, having surface reflectivity values of 72.0% and 52.0%, with leakage values of 2.7% and 10.0% respectively. FIG. 5B summarizes the value of this leakage for different values of the etalon 206 surface reflectivity. The rectangular points in this figure identify the two different etalon 206 designs depicted in FIG. 5A.

For the purpose of this invention, in order to solve these two problems, the etalon 206 is combined with a conventional band-pass filter placed near the focal plane of the optical sensor, which, in embodiments is a Dewar configuration of a conventional LWIR sensor 100. The performance of this composite filter is summarized in FIGS. 6A, 6B and 6C.

Figure 6A:
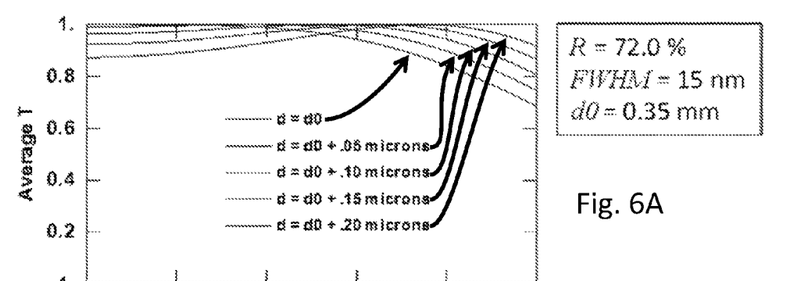
FIG. 6A is a graph of Average Transmittance v. Relative Field Position at a reflectivity of 72% showing the results where the etalon spacing is altered in 5 micron increments.
Figure 6B:
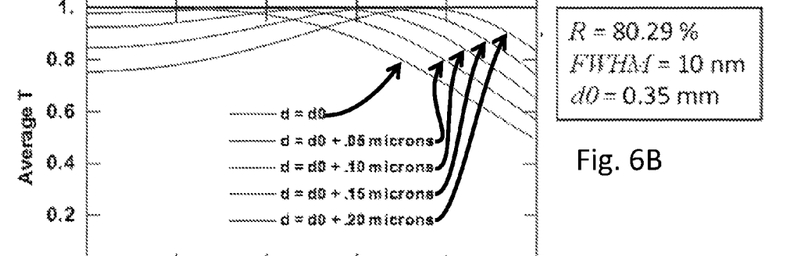
FIG. 6B is a graph of Average Transmittance v. Relative Field Position at a reflectivity of 80.29% showing the results where the etalon spacing is altered in 5 micron increments.
Figure 6C:
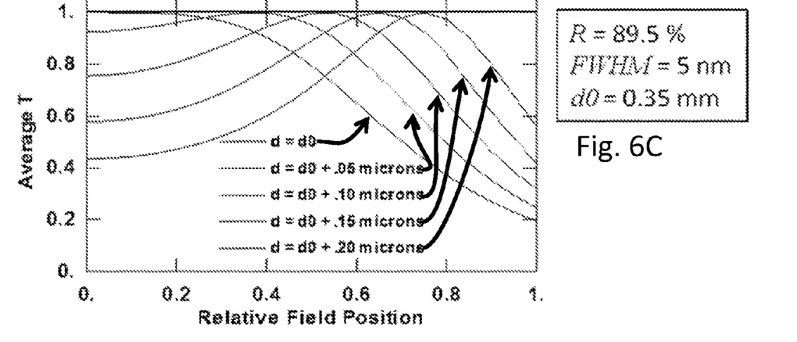
FIG. 6C is a graph of Average Transmittance v. Relative Field Position at a reflectivity of 89.5% showing the results where the etalon spacing is altered in 5 micron increments.

Now referring to FIGS. 6A, 6B and 6C, in the analysis performed, the native etalon 206 performance is shown by the topmost line of each graph. The four lines below this show the performance predication of the composite filter for 4 different band-pass filter combinations, each one having a different band-pass value, Δλ (200 nm, 150 nm, 100 nm, and 50 nm). These figures show that the side-lobes and the mid-point leakage transmission can both be eliminated by combining the etalon 206 with a conventional band-pass filter.

A performance calculation of the complete sensor, with an etalon 206 positioned in the collimated space region 204 of an optical system having a configuration similar to that depicted in FIG. 2, is shown in FIGS. 6A, 6B and 6C. In these figures, the performance characteristics of three different etalon 206 designs are computed. The three different designs are characterized by three different surface reflectivity values (R=72.00%, 80.29%, and 89.50%), and result in transmission FWHM values of 15 nm, 10 nm and 5 nm, respectively. The independent variable (X) is the position in the field of view on the focal plane 110. The value X=0 corresponds to the center of the field of view, and X=1 corresponds to the corner of the field of view. The dependent variable, Y, represents the transmission of the etalon 206, averaged over the clear aperture of the etalon 206 for the field position corresponding to the value of X.

In this analysis, the etalon 206 spacing was tuned slightly by varying the air-spacing by very small amounts. In this case, the etalon 206 spacing was varied by +/−0.10 microns, with the air-spacing changing from 0.35 mm (nominally) to 0.35020 mm. The purpose of this tuning is to adjust the uniformity of the net-transmission over the field of view of the optical sensor.

Figure 3A:
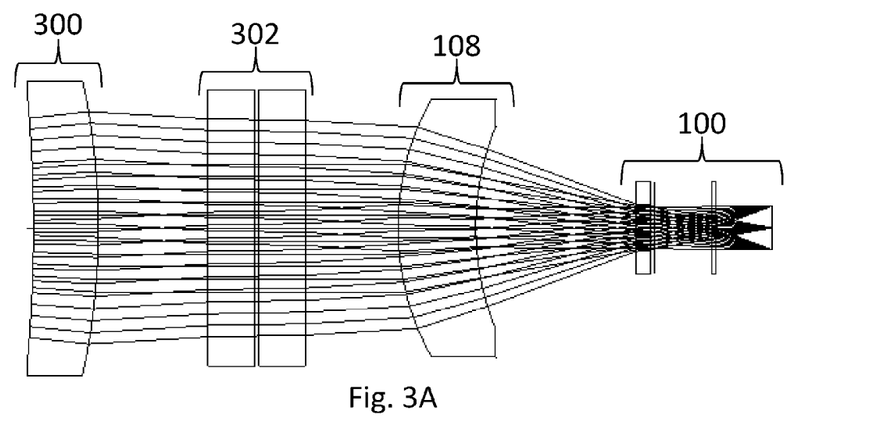
FIG. 3A is a depiction of the relay lens group of FIG. 2 having a flat plano etalon pair.
Figure 3B:
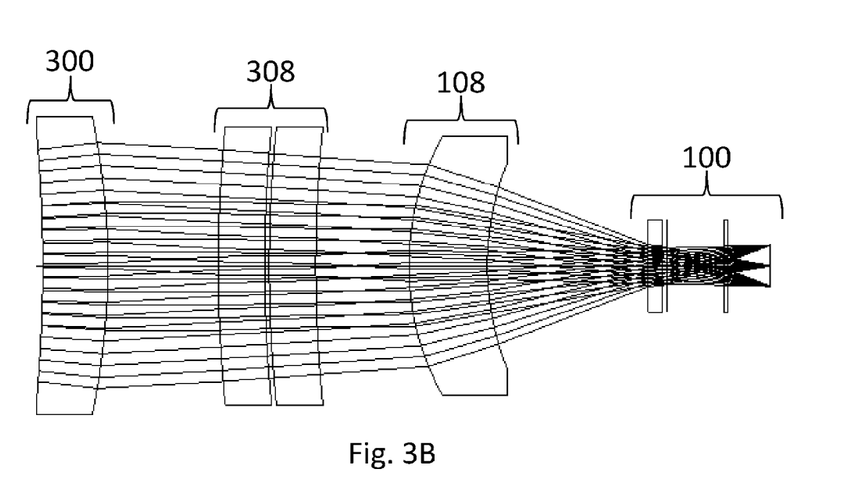
FIG. 3B is a depiction of the relay lens group of FIG. 2 having a curved plano etalon pair.

In the original concept of this invention, a conventional, parallel-plate etalon 302 (i.e. a plano etalon pair 302) having a meniscus lens 300 was assumed. However, in order to reduce the variation of etalon 206 transmission across the field of view, the uniformity of transmission across the pupil can be traded with uniformity of etalon 206 transmission versus field. This can be achieved by making the etalon 206 surfaces slightly convex, resulting in a curved etalon pair 308, as shown in FIGS. 3A and 3B. In these figures, FIG. 3A depicts an embodiment of the present invention with a conventional plano etalon pair 302. FIG. 3B shows another embodiment of the present invention using a curved etalon pair 308. In one embodiment of this invention, all surfaces of the etalon 206 pair had the same curvature and optical analysis was used to determine that a radius of curvature of 300 mm substantially decreased the variation in the curved etalon pair's 308 optical transmission across the field of view of the sensor. Although this analysis assumed that each surface of the curved etalon pair 308 had the same curvature, designing the system such that each surface had slightly different curvature, combined with slight changes in the design of the surrounding optical system, is expected to yield further improvements.

Figure 7A:
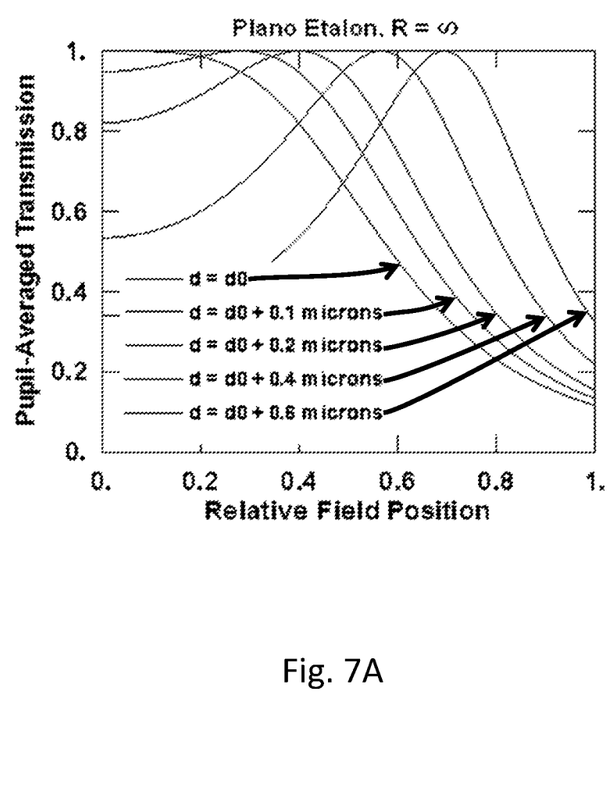
FIG. 7A is a graph of Pupil-Averaged Transmission v. Relative Field Position for a plano etalon pair having a radius of curvature of ∞ (flat), where the etalon spacing is altered in 5 micron increments.
Figure 7B:
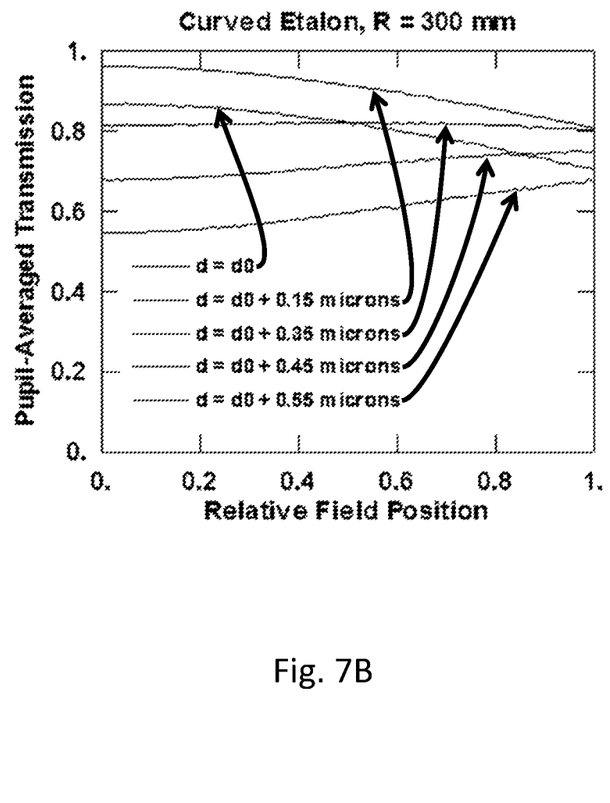
FIG. 7B is a graph of Pupil-Averaged Transmission v. Relative Field Position for a curved etalon pair having a radius of curvature of 300 mm, where the etalon spacing is altered in 5 micron increments.

A performance comparison of this design (with the curved etalon pair 308) and the conventional design (with a plano etalon plate 302) is shown in FIGS. 7A and 7B.

Now referring to FIG. 7B, it can be seen that, for the curved etalon pair 308, an etalon 206 spacing of d=d0+0.35 microns resulted in the most uniform performance across the field of view of the sensor. In this analysis, d0=0.3486 mm.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optical system with ultra-narrow optical band-pass comprising:
   an objective lens group;
   a relay lens group comprising first and second lenses configured to form a collimated space therebetween and further comprising an etalon positioned in the collimated space, wherein said etalon is configured to act as a dichroic band pass filter, said relay group being in optical communication with said objective lens group;
   a Dewar having an evacuated volume in optical communication with said relay lens group and further comprising a Dewar window fixed to an exterior portion of said Dewar and in optical communication with said relay lens group, a cold shield within said evacuated volume and in optical communication with said Dewar window, a band-pass filter positioned within said evacuated volume and in optical communication with said relay lens group through said cold shield and said Dewar window, and a focal plane in optical communication with said band-pass filter, wherein said Dewar window is configured to allow optical communication between said relay lens group and said evacuated volume, said cold shield is configured to protect said focal plane from radiation not focused thereon by said relay lens group, and said band-pass filter is configured to further limit the spectral width of the image projected on said focal plane by said relay lens group; and
   a long-wavelength infrared focal plane array positioned on said focal plane.

2. The optical system of claim 1 wherein said objective lens group comprises a primary convex lens situated to refract light to an objective lens situated to refract light to a secondary convex lens situated to refract light to a biconcave lens.

3. The optical system of claim 1 wherein said etalon comprises a transparent plate with two reflecting surfaces.

4. The optical system of claim 1 wherein said etalon is a Fabry-Perot etalon.

5. The optical system of claim 4 wherein said Fabry-Perot etalon comprises a plano etalon pair.

6. The optical system of claim 5 wherein said plano etalon pair is air spaced.

7. The optical system of claim 5 wherein each etalon in said etalon pair is wedge shaped.

8. The optical system of claim 4 wherein said Fabry-Perot etalon comprises a curved etalon pair, each etalon having a positive meniscus shape.

9. The optical system of claim 8 wherein surfaces of the curved etalon pair are convex.

10. The optical system of claim 9 wherein surfaces of said curved etalon pair are of different curvature.

11. The optical system of claim 8 wherein said curved etalon pair is air-spaced.

12. The optical system of claim 11 wherein the etalon spacing is 0.34895 mm.

13. The optical system of claim 8 wherein all surfaces of said curved etalon pair that are substantially perpendicular to input and output light are of the same curvature.

14. The optical system of claim 8 wherein a radius of curvature of each etalon in said curved etalon pair is 300 mm.

15. The optical system of claim 4 wherein a rear surface of said Fabry-Perot etalon further comprises an anti-reflective coating.

* * * * *